US005532781A

United States Patent [19]
Utagawa et al.

[11] Patent Number: 5,532,781
[45] Date of Patent: Jul. 2, 1996

[54] FOCUS DETECTION DEVICE FOR AN OPTICAL SYSTEM

[75] Inventors: Ken Utagawa; Yosuke Kusaka, both of Yokohama, Japan

[73] Assignee: Nikon Corporation, Tokyo, Japan

[21] Appl. No.: 233,514

[22] Filed: Apr. 26, 1994

[30] Foreign Application Priority Data

Apr. 27, 1993 [JP] Japan ................................. 5-101196

[51] Int. Cl.[6] ....................................... G03B 13/36
[52] U.S. Cl. ................................................ 354/402
[58] Field of Search ............................ 354/402, 406, 354/407, 408; 250/201.2, 201.8

[56] References Cited

U.S. PATENT DOCUMENTS

| | | | |
|---|---|---|---|
| 4,218,623 | 8/1980 | Utagawa | 250/208.2 |
| 4,768,052 | 8/1988 | Hamada et al. | 354/402 |
| 4,857,720 | 8/1989 | Karasaki | 354/408 X |
| 4,949,116 | 8/1990 | Karasaki et al. | 354/408 |
| 4,992,819 | 2/1991 | Ohtaka et al. | 354/408 |
| 5,029,998 | 7/1991 | Utagawa et al. | 354/402 |
| 5,109,154 | 4/1992 | Higashihara et al. | 354/407 X |
| 5,121,152 | 6/1992 | Wagner | 354/402 |
| 5,138,357 | 8/1992 | Utagawa | 354/402 |
| 5,155,518 | 10/1992 | Utagawa | 354/407 |
| 5,233,173 | 8/1993 | Moriyama | 354/406 X |

FOREIGN PATENT DOCUMENTS

4-277712 10/1992 Japan .
4-281417 10/1992 Japan .

Primary Examiner—W. B. Perkey

[57] ABSTRACT

A focus detection device for an optical system which samples discrete areas of an image to determine focus adjustment. The discrete areas are either rectilinear or cross shaped. The rectilinear focus detection areas are inclined relative to the horizontal edge of the finder frame at an angle less than 30° and preferably less than 20°, thus reducing the width of the vertical direction picture elements in the picture element row. This makes it possible to detect both vertical lines and horizontal lines. The cross shaped areas are arranged at central focus detection positions where conditions permit and rectilinear areas are arranged at positions along the horizontal edge of the finder frame. Using a combination of inclined rectilinear and cross shaped, areas traditionally difficult-to-handle objects can be detected to the extent possible in any area.

8 Claims, 7 Drawing Sheets

FIG. 5(g) ○ AREA MARK

FOCUS DETECTION DEVICE FOR AN OPTICAL SYSTEM

BACKGROUND OF THE INVENTION

1. Field of the Invention

The present invention relates to a focus detection device for optical systems such as a camera, and more particularly, to a focus detection device which samples discrete areas of the image in order to determine focus.

2. Description of the Related Art

Cameras are known which sample rectilinear areas at the center of a view-finder in order to determine focus. Further, it is also known to use a central cross-shaped sampling area to determine focus. However, these sampling areas suffer, in that if the image has a linear object which lies parallel to the sampling area, it is difficult to detect, and thus the focus determination will be inaccurate. For example, when photographing artificial objects, or when the camera is held in an unusual manner, the object in the viewfinder often possesses a vertical or horizontal line structure which is parallel or nearly parallel to the edges of the finder frame. In this case, using a rectilinear focus area, parallel to the edges of the rectangular finder frame, it is impossible to detect or correct for focus. In general, lines which lie within 30° of a rectilinear focus detection area are difficult to detect.

A further problem lies in reading narrow image lines lying nearly perpendicular to the focus detection area. This situation occurs due to the resolution of the CCD (Charge Coupled Device) sensor, i.e., the width of the individual elements. It is possible for a line to be slightly skewed, and still register as perpendicular to the focus detection area, decreasing the accuracy of the focus determination. Thus, there also exists a need for a focus detection device able to resolve narrow lines perpendicular to the focus detection area.

It is known to use a plurality of rectilinear focus detection elements. For example, Japanese Patent No. 63-11906 shows arranging rectilinear areas as the focus detection areas at numerous positions. However, these layouts, do not solve the problem of poor focus adjustment when the image contains line parallel to the elements.

It has also been proposed to place cross-shaped elements at each focus detection position. However, this has proven technically difficult, making it preferable to use a combination of cross and rectilinear shaped elements. For example, Japanese Patent No. 2-120712 shows arranging cross-shaped areas and rectilinear areas in a mixed manner at numerous positions. However, these layouts do not solve the problem. There still exists situations in which a linear image element will lie parallel to the detecting elements. Thus, there exists a need for discrete focus detection areas capable of detecting linear image elements parallel to the edges of the view-finder.

One possible remedial measure is to diagonally incline and arrange the rectilinear area to about 45° relative to the finder frame. However, due to constraints stemming from spatial competition with the detection optical system, relative to adjacent areas according to the position in which the area is arranged, and from the hereinafter described inability to utilize large sub-mirrors, it is difficult to incline the detection area to approximately 45°.

Figure 3A:
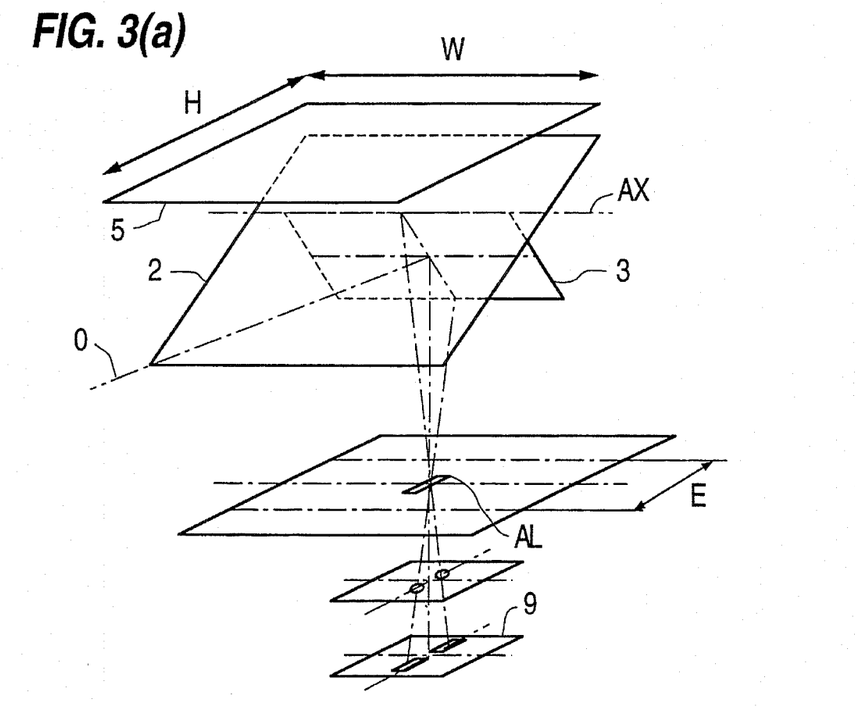
FIGS. 3(a) and 3(b) are isometric diagrams showing the relation between the spread of the focus detection light beam and the focus detection areas for a focus detection system according to a preferred embodiment of the present invention.
Figure 3B:
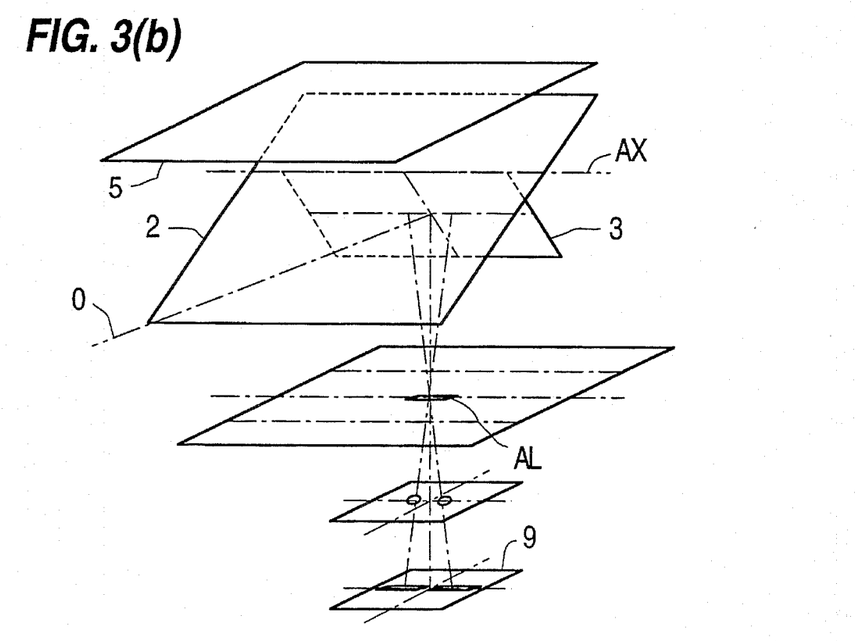

Referring to FIGS. 3 (a) and 3(b) the light beams entering the camera are guided to the focus detection mechanism, arranged at the bottom of the mirror box in a single-lens reflex camera, by the sub-mirror 3 which receives the light through a semi-transparent area of the main mirror 2. On the AX axis, which crosses the main mirror surface where the extended surface of the sub-mirror intersects the main mirror, the size of the sub-mirror can be large. However, in the direction perpendicular to the AX axis, the light beams are constrained and focus detection can only be conducted in a narrow range E.

Furthermore, even if the positions where the focus detection areas are placed are identical, as where the lengthwise direction of the focus detection area is in the short edge direction of the sub-mirror (see FIG. 3(a) when one takes into account the spread of the detection light beam, the degree of freedom is small. In contrast, in the case where the lengthwise direction of the focus detection area is on the axis AX (see FIG. 3(b), the degree of freedom of the detection light beam is large.

Accordingly, in the case where a focus detection area is provided in the vicinity of the boundary line of the range E, it is necessary to make the angle formed by the boundary line of range E with the lengthwise direction of the focus detection area, i.e., the angle formed with the axis AX, as small as possible.

SUMMARY OF THE INVENTION

Accordingly, it is an object of the present invention to provide a focus detection device able to detect objects with a linear form parallel to the focus detection areas.

It is another object of the present invention to provide a focus detection device able to accurately resolve objects with a linear form lying nearly perpendicular to the focus detection areas.

Additional objects and advantages of the invention will be set forth in part in the description which follows, and, in part, will be obvious from the description, or may be learned by practice of the invention.

The foregoing objects of the present invention are achieved by providing a focus detection system for optical systems that includes rectilinear focus detection areas inclined relative to a finder frame to an angle less than 30° and preferably less than 20°, making it possible to detect both vertical lines and horizontal lines.

The above objects of the present invention may also be achieved in a focus detection device wherein a cross-shaped focus detection area is arranged at the center with rectilinear areas being arranged on the outer sides of the cross-shaped area.

The above objects are further achieved by a focus detection device provided with focus detection areas wherein the individual detector elements of the areas are inclined.

Since rectilinear areas are provided which are able to detect not only vertical lines but also horizontal lines, and since, with regard to multi-areas, cross-shaped areas are, where conditions permit, arranged at focus detection positions and rectilinear areas are arranged at positions where detection conditions are severe, focusing problems can be reduced to a great extent.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

FIGS. 1(a), 1(b), 1(c) and 2 are diagrams of a focus detection system for an optical system in accordance with a first preferred embodiment of the present invention. Light passing through a photographic lens 1 is partially reflected by a main mirror 2, and forms the image of the object on a finder screen 5 having height H and width W. The photographer can observe the finder screen image which is enclosed by the view frame. Some of the light passes through the main mirror and is deflected downwards by a sub-mirror 3 where it its guided through aperture AL to a focus detection device 9 near the bottom of the camera.

Referring now to FIG. 3, wherein the relation between the spread of the focus detection light beam and the focus detection areas is shown. Since the range in which the light beam can be maintained in the short edge direction H of the sub-mirror 3 is restricted to the area shown as E, it is narrow in comparison to the exposure range of the film and the length of the short edge of the finder visual field.

Figure 1A:
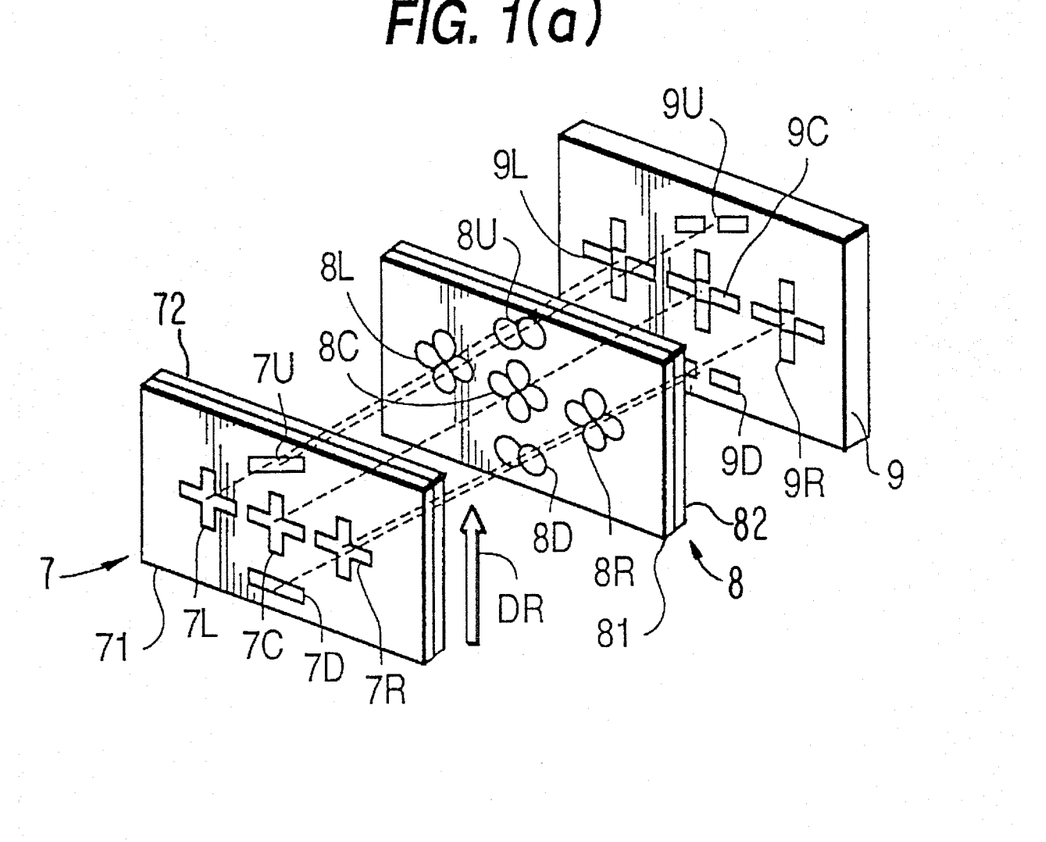
FIGS. 1(a)–1(c) are diagrams of a focus detection system for an optical system according to a preferred embodiment of the present invention.
Figure 1B:
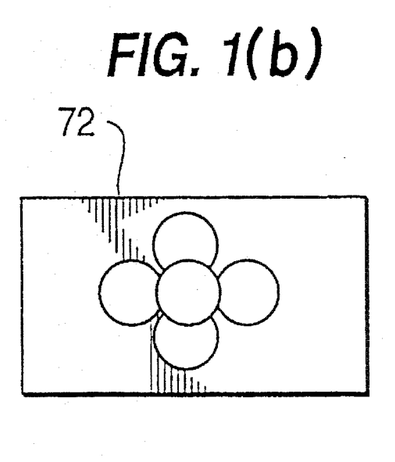
Figure 1C:
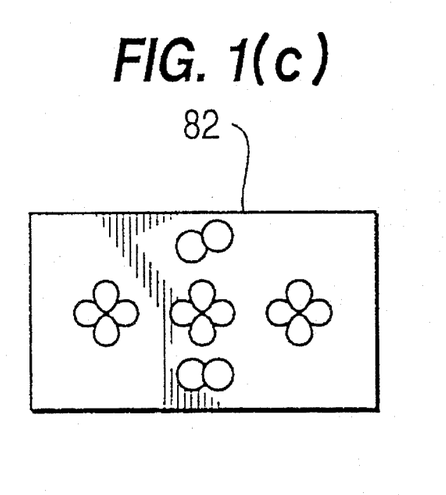
Figure 2:
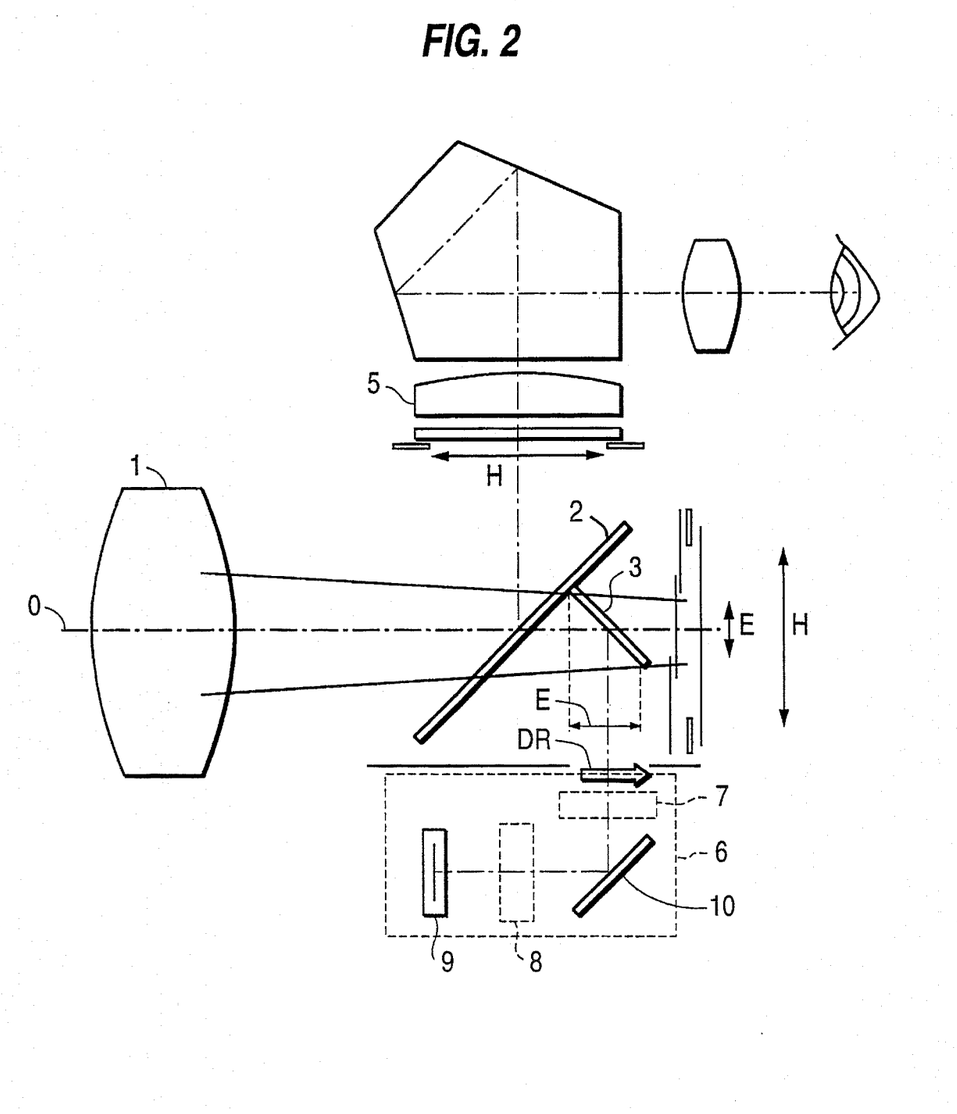
FIG. 2 is a diagram of an optical system provided with a focus detection optical system according to a preferred embodiment of the present invention.

Once again referring to FIGS. 1(a), 1(b), 1(c) and 2, the arrows DR and H show the arrangement of FIG. 1(a) to FIG. 2 and FIG. 3(a). An optical block 7 comprises a visual field mask 71, which shields parts of the image other than the focus detection areas, and a field lens 72 which receives the light admitted in each area. The light passing through the field lens 72 is bent by a mirror 10 (see FIG. 2) and is guided to an optical block 8. The optical block 8 comprises a pair of image reformation lenses 82 corresponding to each focus detection area, and aperture-stop masks 81 which are placed in front of them. The light beams which pass through each image reformation lens are guided to photoelectric conversion element arrays located on the sensor base 9.

Tracing the light rays received by the photoelectric conversion element arrays on sensor base 9 backwards, it is seen that the light received by, for example cross shaped array pairs 9R and 9L, passes through two sets of image reformation lens pairs 82 and the two sets of aperture pairs 8R and 8L in front of them, and is initially received by the apertures 7R and 7L of the visual field mask via the field lens. Moreover, by means of the action of the image reformation lens pair 82 and aperture pairs 8U and 8D in front of it, the image of a photoelectric conversion element array pairs 9U and 9D, which are side by side in linear form, were originally received by rectilinear apertures 7U and 7D, respectively, of the visual field mask via the field lens. Similarly, light received by cross shaped array pair 9C is masked by aperture 7C and transmitted via lens pairs 82 by aperture pairs 8C.

In the example shown in FIGS. 1(a)–1(c), a cross-shaped area is centrally arranged on the optical axis O of the photographic lens. Further, two cross-shaped areas are formed on either side along the axis AX (see FIGS. 3(a) and (b)), that is, in the lengthwise direction of the sub-mirror. However, in the direction shown by E in FIG. 2, as the spread of the light beam for an arrangement of three cross-shaped areas cannot be maintained in the short edge direction of the sub-mirror, rectilinear apertures 7D and 7U are arranged on both sides of the cross-shaped area on the optical axis O. The rectilinear aperture 7D of one side is slightly inclined relative to the axis AX. Similarly, the other rectilinear aperture 7U is also slightly inclined relative to the axis AX. Referring now to FIG. 5(b), this figure shows the focus detection areas according to the multi-area arrangement shown in FIG. 1, in their corresponding position in a viewfinder.

Figure 4A:
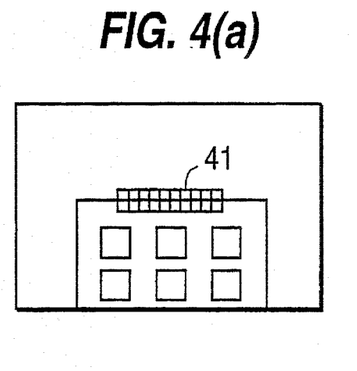
FIGS. 4(a) through 4(g) are diagrams showing the effect of area inclination in the case where the focus detection area is a rectilinear area.

In general, there is a high probability of having vertical and horizontal lines in any given image. Referring now to FIG. 4(a), a rectilinear focus detection area is shown over an image in a viewfinder. When a rectilinear area parallel to the lengthwise direction of the finder visual field (which coincides with the axis AX) is arranged in the manner of area 41, the output of the photoelectric conversion element array becomes flat as shown in FIG. 4(c), and focus detection becomes impossible.

Figure 4B:
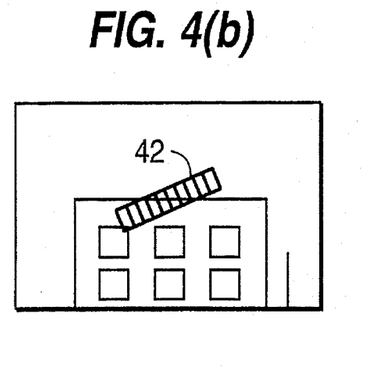
Figure 4C:
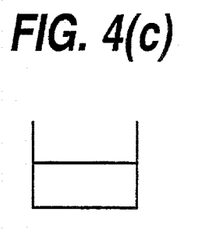
Figure 4D:
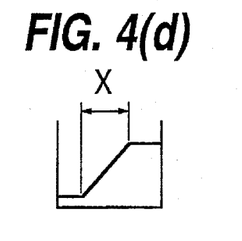

Referring now to FIG. 4(b), an inclined rectilinear focus detection area is shown over an image in a viewfinder. When the rectilinear area is slightly inclined as in FIG. 4(b) the output of the photoelectric conversion element array 9 produces an inclined pattern as shown in FIG. 4(d). Using this configuration, focus detection becomes possible if the length X of the inclined part is not too long. The steeper the slope of the signal, the more the detection accuracy is improved. When the slope of the signal decreases beyond a certain point, detection errors remarkably increase, and focus detection becomes impossible.

Accordingly, it is preferable to shorten the length X of the inclined part of the signal. Further, it is preferable to make the angle of inclination $\Theta$ approximately 45°. Yet, even if rectilinear areas having inclines of about 45° are arranged at both ends of the short edge direction E of the view frame, focus detection becomes impossible due to the constraints on the light beam reflecting from the sub-mirror, as described above. Moreover, the central cross-shaped area and the optical system overlap, which renders focus detection unfeasible.

Consequently, due to the constraints of the spread of the light beam, the possible arrangements of focus detections areas at the periphery of the view frame short edge direction E are limited to rectilinear areas. Further, the acceptable range of the angle ⊖, formed by the lengthwise direction of the rectilinear area (the direction of the picture element image arrangement) and the view frame long edge direction (the direction of the axis AX), is limited. It is desirable that the angle ⊖ be below 30°, and more preferably below 20°. When the angle ⊖ is too small, X (see FIG. 4(d)) becomes large, and focus detection tends to become unfeasible. In order to make focus detection possible, it is necessary to narrow the width of the vertical picture elements in the direction of the picture element row and shorten the length Y (see FIG. 4(e)) of the line portion which traverses the picture element row. The length of Y, based on finder visual field conversion (focus detection surface conversion), should be below 1.5 mm, and below 0.8 mm is more preferable.

Figure 4E:
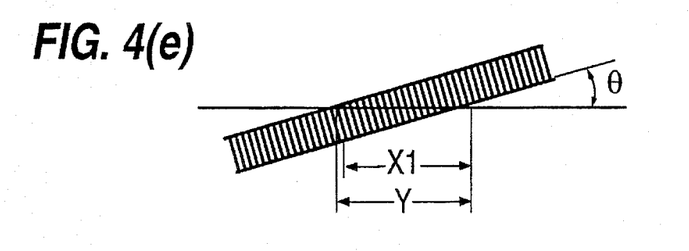

Referring now to FIG. 4(e), the range of the picture element traversed by the length Y is shown as X1. Expressed in terms of the number of elements on the photoelectric conversion array, within twenty elements is preferable, and within ten elements is more preferable.

Figure 4F:
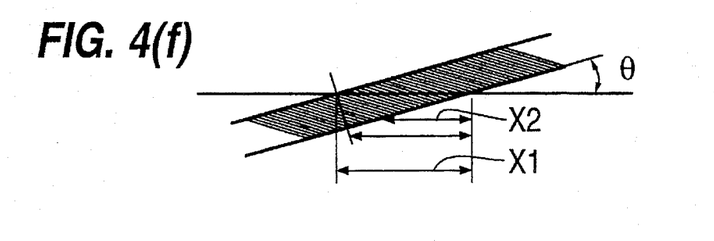
Figure 4G:
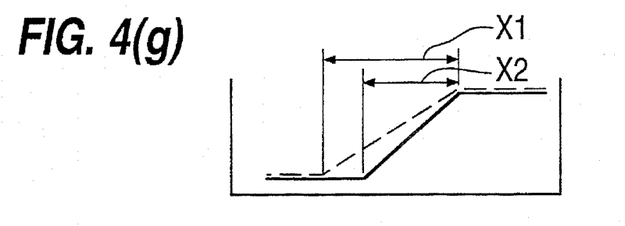

Referring now to FIG. 4(f), when the boundary of the photoelectric conversion array elements are inclined such that the angle which is formed with the line portion decreases, it is possible, as is clear in the drawing, to reduce the number of elements relative to the length Y of the line portion as shown by X2. In this case, the length of the inclined part of the image output of the photoelectric conversion element array is shortened, as shown in FIG. 4(g) from X1 to X2, and detection accuracy is improved.

In relation to the element pitch, i.e. the horizontal spread in the linear direction of the array, and to the element width, i.e. the vertical spread of the elements in the linear direction, it is preferable that the element width be no more than four times the element pitch. It is also important to reduce the width of the elements which are perpendicular to the element arrangement direction.

With regard to cross-shaped focus detection areas, in relation to the rectilinear areas which are its constituent elements, if the line portion which is perpendicular to the lengthwise direction of one of the rectilinear areas and the line portion which has an inclination range of 45° relative to this line portion are detectable, it is possible to set the width of the elements more widely. This allows the quantity of light to be sensed. In contrast to this, with regard to the rectilinear area, it is preferable to make the element width as narrow as possible. That is, in comparison to the width of picture elements in the cross-shaped area, it is preferable to narrow the width of the picture elements in the rectilinear area. Referring now to FIG. 5(h) and FIG. 5(i), the figures show examples of rectilinear and cross-shaped focus detection areas. With regard to the rectilinear area, the inclined arrangement of the upper rectilinear area of FIG. 5(h) is preferable to the case of no inclination as in FIG. 5(i). However, by narrowing the width of the rectilinear area, as in the example shown in FIG. 5(i), even though a horizontal line is undetectable, a slightly inclined line becomes detectable.

Although the first embodiment of the present invention has been described with respect to a specific configuration for the layout of the focus detection areas, it will be recognized that the first embodiment is not limited to those specific layouts. Referring now to FIGS. 5(a) through 5(j), these figures show various alternative focus detection area layouts according to the first preferred embodiment of the present invention.

Since the direction of the axis AX in FIGS. 3(a) and 3(b) coincide with the lengthwise direction of the view frame due to the relation with the submirror arrangement which is a constraining condition, the focus detection area arrangement are described in relation to the view frame as seen by the photographer.

Figure 5A:
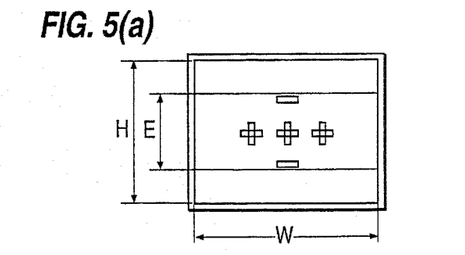
FIGS. 5(a) through 5(j) are diagrams showing focus areas layouts within a finder view frame according to preferred embodiments of the present invention.
Figure 5B:
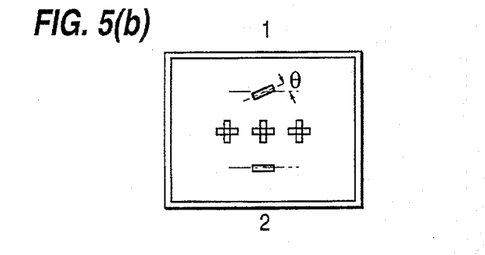

Referring now to FIG. 5(a) an arrangement is shown with a cross-shaped area at the center of the visual field. Further cross-shaped areas are placed on both the left and right sides of the lengthwise direction of the view frame. Finally, rectilinear areas are placed on both the top and bottom sides of the central cross-shaped area. In this embodiment, the lengthwise direction of the rectilinear areas coincides with the lengthwise direction of the view frame. In this configuration, a horizontal line object such as in FIG. 4(a) will not be detected by the upper and lower rectilinear areas. However, the eclipsing of the light beam by the sub-mirror and the spatial competition between the detection optical system and the central cross-shaped area are reduced.

Referring now to FIG. 5(i), an improved version of the cross shaped and rectilinear areas portrayed in accordance with FIG. 5(a) is shown. Here, the width of the rectilinear area is smaller than the corresponding cross-shaped area. With regard to this rectilinear area, although a perfectly horizontal line cannot be detected, a horizontal line with a slight inclination is detectable. Referring now to FIG. 5(d), an improved version of the embodiment in accordance with FIG. 5(a) is shown. Here, the upper and lower rectilinear areas are inclined at a slight angle ⊖ allowing for the detection of lines parallel to the axis AX.

Referring now to FIG. 5(b), an improved version of the embodiment in accordance with FIG. 5(a) is shown. Here, only the upper rectilinear area has been inclined at a slight angle ⊖. Due to the sub-mirror constraint, the light beam is only usable in the range of E shown in FIG. 2. Yet, the film surface side of the sub-mirror has the flexibility to slightly expand the sub-mirror, and consequently the light beam range in this direction can be slightly widened. Since this direction corresponds to the top side of the view finder shown in FIG. 5(b), only the rectilinear area of this direction has been inclined.

Referring now to FIG.(j) an improved version of the embodiment in accordance with FIG. 5(a) is shown. Here, the upper rectilinear area has been inclined at a slight angle ⊖.

Figure 5C:
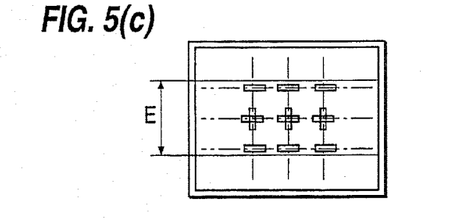
Figure 5D:
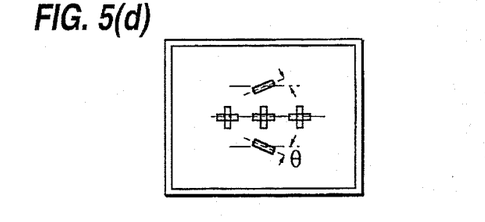
Figure 5E:
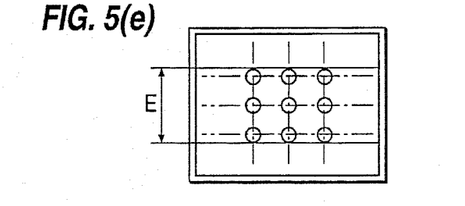
Figure 5F:
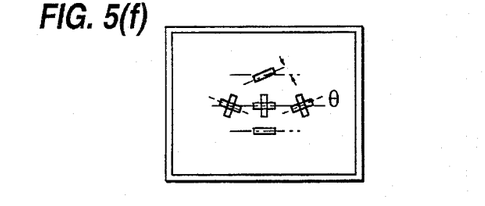

Referring now to FIG. 5(c), the figure shows an example where rectilinear areas have been provided on the top and bottom of three horizontally aligned cross-shaped areas.

Figure 5G:
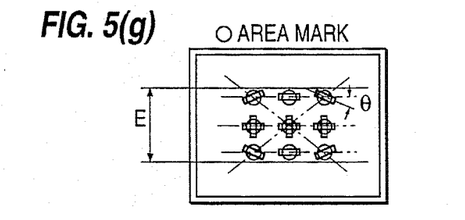
Figure 5H:
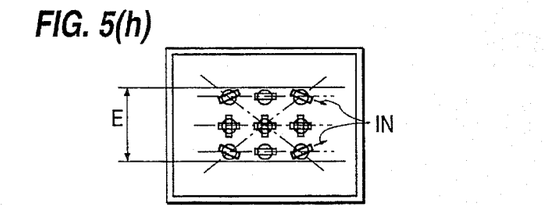
Figure 5I:
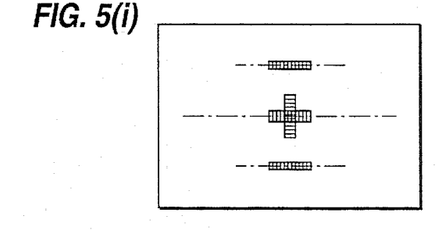
Figure 5J:
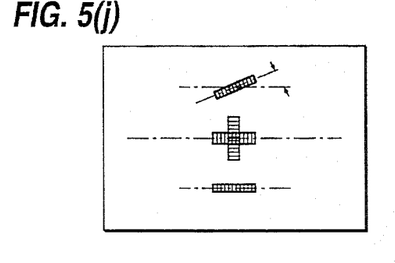

Referring now to FIG. 5(g), an improved version of the embodiment in accordance with FIG. 5(c) is shown. Here, the rectilinear areas at each corner are inclined toward the circumferential direction of a circle centering on the visual field center. Of course, it is also acceptable to incline the central top and bottom areas as in FIG. 5(d).

In the foregoing explanations, the forms of the rectilinear areas and cross-shaped areas have been expressed and explained in terms of their correspondence to the view frame. These rectangles and cross-shaped areas show the range in which the image in their interiors is guided onto the photoelectric conversion element array, and do not necessarily signify the focus detection area marks which are displayed on the finder screen. The focus detection area marks are displayed on the finder screen, in the case of FIG. 5(c) and FIG. 5(g), as shown in FIG. 5(e).

In general, focus alignment determination is conducted with the image in the specified range of the central part of the photoelectric conversion element array, and the position of the visual field corresponding to this specified range is displayed to the photographer as the focus detection area. The end parts of the photoelectric conversion element array are used for detection in cases where the defocus is large, but are not used in focus alignment determination.

Referring now to FIG. 5(h), this figure shows an improvement for the case of inclination of the rectilinear areas. Here, after the rectilinear areas have been inclined, the areas are moved in the direction away from the boundary of the vertical range E along the lengthwise direction of the areas (along the arrow mark IN of FIG. 5(h)). In this case, if the focus detection area marks which are displayed in the finder are the same as in FIG. 5(e), the area marks overlap with the end of the rectilinear areas (as illustrated). Thus, focus alignment determination is conducted with the image of the part corresponding to the area mark display of one end of the photoelectric conversion element array.

Figure 6:
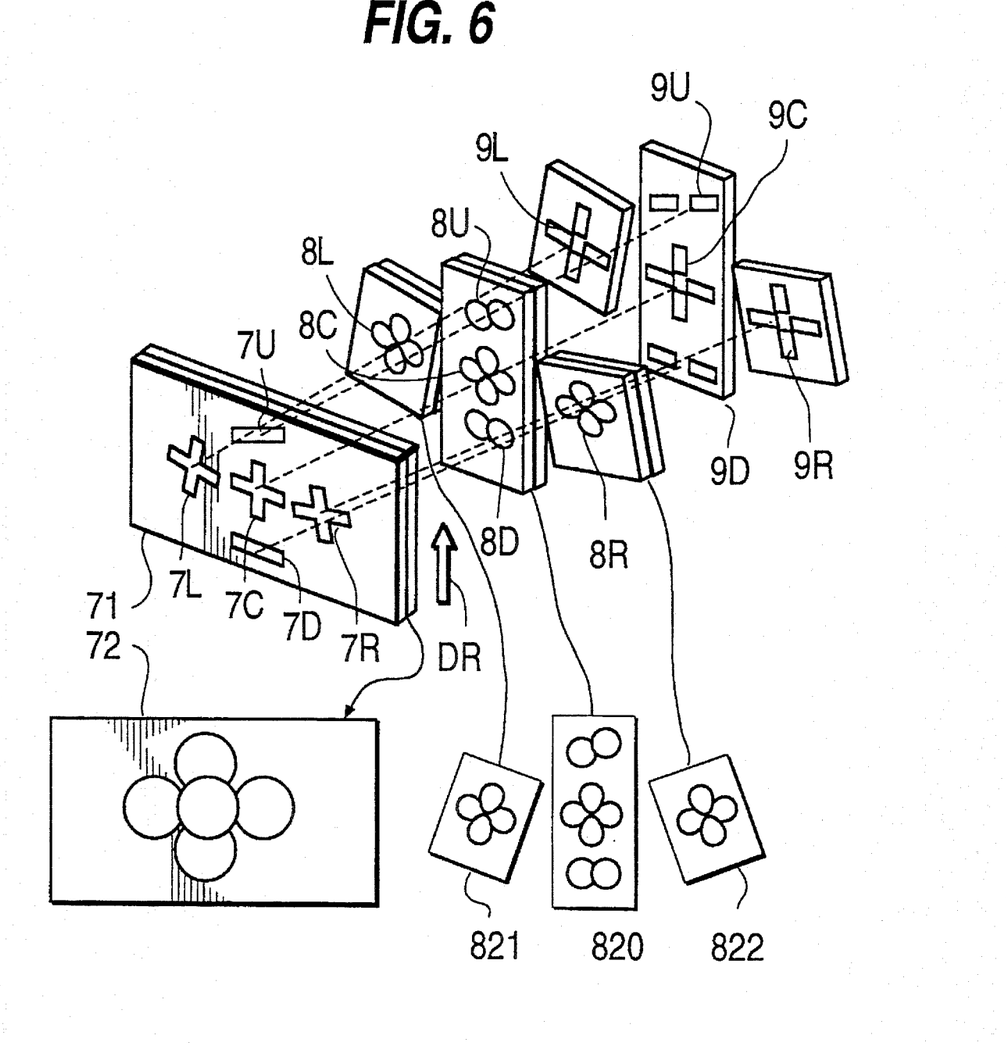
FIG. 6 is a block diagram of the focus detection optical system according to a preferred embodiment of the present invention.

Referring now to FIG. 6, this figure shows an isometric diagram of a focus detection system for an optical system in accordance with a second embodiment of the present invention. The basic configuration of the optical system of FIG. 6 is similar to the optical system of FIG. 1(a)–1(c).

In the case of FIG. 1, the image reformation lens pairs and the photoelectric conversion element array pairs relating to the three cross-shaped areas are integrally formed. Yet, in the first embodiment, there is little freedom for adjustment. Thus, in order to introduce freedom for adjustment, the image reformation lens parts 820, 821, 822 relating to each focus detection area, and the photoelectric conversion element array parts corresponding to each lens are separate, independently adjustable, areas.

With regard to the cross-shaped areas of both sides, an identical photoelectric conversion element array can be used to decrease costs. Furthermore, the cross-shaped areas of the two sides are slightly inclined, and in the case where the arrangement of the areas is applied to the finder screen, an arrangement as in FIG. 5(f) is used.

Figure 7A:
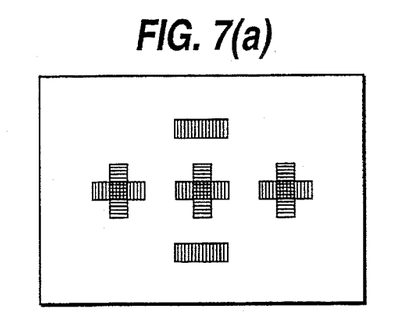
FIGS. 7(a) and 7(b) are diagrams showing the focus detection areas in relationship to the finder view frame in a preferred embodiment of the present invention.
Figure 7B:
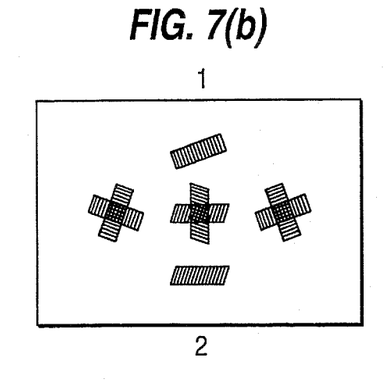
Figure 8A:
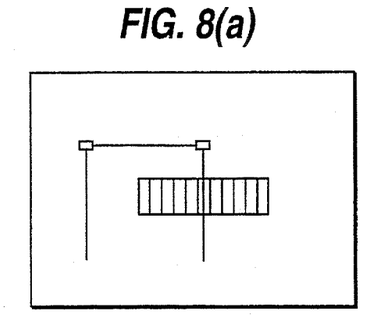
FIGS. 8(a) through 8(c) are diagrams showing the effects of the arrangement of the focus detection areas and the form of the picture element boundaries in accordance with a preferred embodiment of the present invention.
Figure 8B:
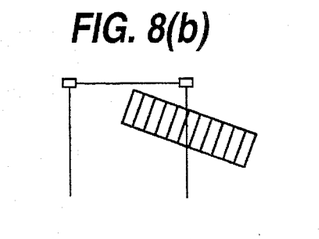
Figure 8C:
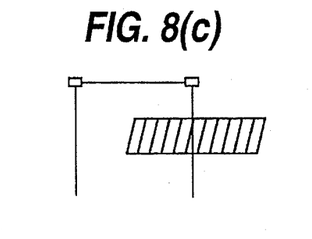

The reasons for inclining the cross-shaped areas of both sides are explained with reference to FIGS. 8(a), 8(b), and 8(c). FIG. 8(a) shows the relation between the ordinary placed rectilinear area, its component element and the image which is projected thereon. In the figure, rod-like images with a width narrower than the pitch of one element are formed. Since the output from the photoelectric conversion element is not altered (even if the image is slightly moved to the right or left) there is the problem that focus detection accuracy, relative to this type of fine line, declines. In order to avoid this, a configuration as in FIG. 8(b) is used, wherein the focus detection area itself is slightly inclined such that a vertical line unfailingly overlaps with a plurality of picture elements. Moreover, as shown in FIG. 8(c), the detection area itself need not be inclined, rather only the boundary of the picture elements may be inclined to the extent that a vertical line unfailingly overlaps with a plurality of picture elements. FIG. 7(b) shows the relation of area arrangement and picture element arrangement in the case where these fine line countermeasures have been adopted.

Referring once again to FIG. 6, the cross-shaped areas of both sides have been inclined slightly to implement the aforementioned fine line coutermeasures. Further the central cross-shaped area and the lower rectilinear area, have also been inclined as a fine line countermeasure.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A focus detection device for a camera provided with an objective lens having a predetermined image plane, the focus detection device comprising:

a light shielding mask disposed near the predetermined image plane, said light shielding mask provided with a center aperture substantially near the center of said light shielding mask, said light shielding mask provided with an upper aperture above said center aperture, said light shielding device provided with a bottom aperture below said center aperture;

an image sensor device, said image sensor device provided with two sensor arrays disposed orthogonally to each other, said image sensor device provided with a first and second rectilinear sensor array, said first rectilinear sensor array being disposed above said orthogonally disposed sensor arrays, said second rectilinear sensor array being disposed directly below said orthogonally disposed sensor arrays opposite said first rectilinear sensor array at least one of said rectilinear arrays being non-parallel with each of said orthogonally disposed sensor arrays; and a re-imaging optical system adapted to form distributions of intensity of light from the light passed through said center aperture on said orthogonally disposed sensor arrays, said re-imaging optical system adapted to form distributions of intensity of light from the light passed through said upper aperture on said first rectilinear sensor array, said re-imaging optical system adapted to form distributions of intensity of light from the light passed through said bottom aperture on said second rectilinear sensor array.

2. A camera provided with an objective lens having a predetermined image plane, the camera comprising:

a light shielding mask disposed near the predetermined image plane, said light shielding mask provided with a center aperture substantially near the center of said light shielding mask, said light shielding mask provided with an upper aperture above said center aperture, said light shielding device provided with a bottom aperture below said center aperture;

an image sensor device, said image sensor device provided with two sensor arrays disposed orthogonally to each other, said image sensor device provided with a first and second rectilinear sensor array, said first rectilinear sensor array being disposed directly above said orthogonally disposed sensor arrays, said second rectilinear sensor array being disposed directly below said orthogonally disposed sensor arrays opposite said first rectilinear sensor array;

a re-imaging optical system adapted to form distributions of intensity of light from the light passed through said center aperture on said orthogonally disposed sensor arrays, said re-imaging optical system adapted to form distributions of intensity of light from the light passed through said upper aperture on said first rectilinear sensor array, said re-imaging optical system adapted to form distributions of intensity of light from the light passed through said bottom aperture on said second rectilinear sensor array;

a main mirror provided with a semi-transparent portion, said main mirror situated behind the objective lens;

a sub-mirror positioned behind said main mirror adapted to reflect light passing through said main mirror to said light shielding mask;

one of said rectilinear sensor arrays receiving light reflected from the area of said sub-mirror nearest to said main mirror; and the other of said rectilinear sensor arrays receiving light reflected from the area of said sub-mirror farthest from said main mirror.

3. A focus detection device for a camera provided with an objective lens having a predetermined image plane, the focus detection device comprising:

a light shielding mask disposed near the predetermined image plane, said light shielding mask provided with a center aperture substantially near the center of said light shielding mask, said light shielding mask provided with an upper aperture directly above said center aperture, said light shielding device provided with a bottom aperture directly below said center aperture, said light shielding mask provided with a right side aperture to the right of said center aperture, said light shielding device provided with a left side aperture to the left of said center aperture;

an image sensor device provided with a first, second and third orthogonal sensor array and a first and second rectilinear array;

a first re-imaging optical system for forming on said first orthogonal sensor array a distribution of intensity of light from light passed through said center aperture;

a second re-imaging optical system for forming on said second orthogonal sensor array a distribution of intensity of light from light passed through said right side aperture;

a third re-imaging optical system for forming on said third orthogonal sensor array a distribution of intensity of light from light passed through said left side aperture;

a fourth re-imaging optical system for forming on said first rectilinear sensor array a distribution of intensity of light from light passed through said upper aperture; and a fifth re-imaging optical system for forming on said second rectilinear sensor array a distribution of intensity of light from light passed through said bottom aperture.

4. A focus detection device, as recited in claim 3 further comprising:

a main mirror provided with a semi-transparent portion, said main mirror situated behind the objective lens;

a sub-mirror positioned behind said main mirror adapted to reflect light passing thought said main mirror to said light shielding mask;

said center aperture, said right side aperture, and said left side aperture arranged along an imaginary line substantially parallel to a second imaginary line created by the intersection of the plane of said sub-mirror with said main mirror.

5. A focus detection device for a camera provided with an objective lens having a predetermined image plane, the focus detection device comprising:

a light shielding mask disposed near the predetermined image plane, said light shielding mask provided with an aperture;

an image sensor device provided with a rectilinear sensor array;

a re-imaging optical system for forming on said sensor array a distribution of intensity of light from light passed through said aperture;

a rectangular view frame provided with a vertical and a horizontal edge;

a main mirror adapted to reflect an image on the image plane to said rectangular view finder, said main mirror provided with a semi-transparent portion and situated behind the objective lens;

a sub-mirror positioned behind said main mirror, adapted to reflect light passing through said main mirror to said light shielding mask, said sub-mirror having a first end portion situated near said main mirror and a second end portion situated farther from said main mirror than said first end portion; and said rectilinear sensor array disposed such that an angle $\Theta$ between said rectilinear sensor array and a line in the image parallel to said horizontal edge of the view frame is greater than 0 degrees and less than 30 degrees, said rectilinear sensor array receiving light from one of the first end portion and the second end portion of said sub-mirror.

6. A focus detection device, as recited in claim 5 further comprising:

said rectilinear sensor array comprising a plurality of elements; and said line in the image being projected on less than twenty elements of said rectilinear sensor array.

7. A focus detection device for a camera provided with an objective lens having a predetermined image plane, the focus detection device comprising:

a light shielding mask disposed near the predetermined image plane, said light shielding mask provided with a first and second aperture;

an image sensor device provided with two sensor arrays disposed orthogonally to each other, said image sensor device provided with a rectilinear sensor array;

said orthogonally disposed sensor arrays and said rectilinear sensor array comprising a plurality of elements;

a re-imaging optical system adapted to form on said orthogonally disposed sensor arrays a distribution of intensity of light from light passed through said first aperture, said re-imaging optical system adapted to form on said rectilinear sensor arrays a distribution of intensity of light from light passed through said second aperture; and the elements of said rectilinear sensor array having widths less than the widths of the elements in said orthogonally disposed sensor arrays.

8. A focus detection device for a camera provided with an objective lens having a predetermined image plane, the focus detection device comprising:

a light shielding mask disposed near the predetermined image plane, said light shielding mask provided with a center aperture substantially near the center of said light shielding mask, said light shielding mask provided with an upper aperture above said center aperture, said light shielding mask provided with a right side aperture to the right of said center aperture;

a image sensor device provided with a first and second orthogonal sensor array and a rectilinear array;

a first re-imaging optical system for forming on said first orthogonal sensor array a distribution of intensity of light from light passed through said center aperture;

a second re-imaging optical system for forming on said second orthogonal sensor array a distribution of intensity of light from light passed through said right side aperture;

a third re-imaging optical system for forming on said rectilinear sensor array a distribution of intensity of light from light passed through said upper aperture;

said first orthogonal sensor array disposed on a first IC chip; and said second orthogonal sensor array disposed on a second IC chip.

* * * * *